(No Model.)

G. O. C. SRYGLEY.
PLOW.

No. 312,398.   Patented Feb. 17, 1885.

WITNESSES
J. Bowen
E. G. Siggers

G. O. C. Srygley
INVENTOR
by C. A. Snow & Co.
Attorneys

UNITED STATES PATENT OFFICE.

GEORGE O. C. SRYGLEY, OF BARTON, ALABAMA.

PLOW.

SPECIFICATION forming part of Letters Patent No. 312,398, dated February 17, 1885.

Application filed July 22, 1884. (No model.)

*To all whom it may concern:*

Be it known that I, GEORGE O. C. SRYGLEY, a citizen of the United States, residing at Barton, in the county of Colbert and State of Alabama, have invented a new and useful Improvement in Plows, of which the following is a specification, reference being had to the accompanying drawings.

My invention relates to plows; and it has for its object to provide a device of this character with a pivoted or hinged clod-crusher.

A further object of the invention is to provide a plow of cheap, simple, and durable construction, and one that will be effective in its operation.

With these ends in view the invention consists in the improved construction and combinations of parts, hereinafter fully described, and pointed out in the claim.

Figure 1:
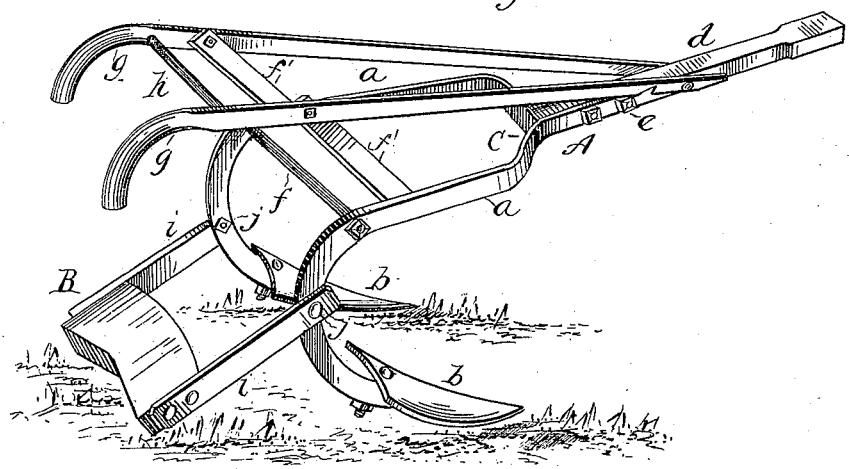
Figure 2:
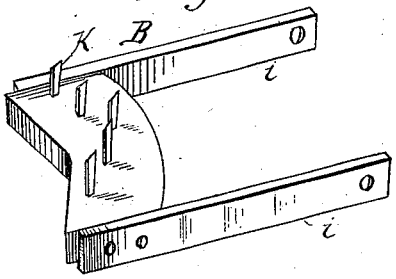

In the drawings, Figure 1 is a perspective view of a plow constructed in accordance with my invention. Fig. 2 is a detail view of the clod-crushing block.

In the accompanying drawings, in which like letters of reference indicate corresponding parts in both the figures, A represents the plow-frame, consisting of the two sides $a$, which are constructed of metal, and curved or bent downwardly at their rear ends. Upon the said curved ends are provided the usual shares, $b$, of any desired construction. The forward ends of the sides are bent inwardly, as shown at $c$, and inclose the rear end of the plow-beam $d$, which is secured between said sides by means of transverse bolts $e$. The sides are braced near their rear ends by means of a rod, $f$, and secured to the inner faces of said sides, adjacent to said bracing-rod, are uprights or standards $f$, which are inclined in a slightly rearward direction. Secured to the upper ends of these inclined standards $f$ are the handles $g$, which are secured to the plow-beam near the forward end thereof, said handles being braced near their rear ends by means of a cross-strip, $h$.

B represents the clod-crusher, which is pivoted or hinged to the rear end of the plow-frame. This clod-crusher consists of the side strips, $i$, having openings at their forward ends for the passage of pivot-bolts $j$.

Between the side strips, $i$, at their rear ends, is secured the crusher-block, which is preferably constructed of wood. This block is provided with a series of knives or cutters, $k$, which are preferably arranged, as shown, to form an arc of a circle. The said block $i$ is recessed or cut away at its lower end, as shown, so that when the plow is out of the ground the crusher will slide on the edges formed by recessing said block, and thus expose only a small portion of the crusher to the action of the ground and stones upon the same when the crusher is in the position shown in Fig. 1. It will be observed that as the shares are in the ground the crushing-block will travel in rear thereof, and crush or cut any lumps or clods of earth, and that as it is hinged or pivoted any liability of the same to become broken is prevented. It will also be seen that a plow constructed in accordance with my invention is simple in its construction, may be manufactured and supplied at a slight cost, that its operation is effective, and, further, that a plow constructed as above described is durable and not liable to be broken.

Having fully described my invention, what I claim as new, and desire to secure by Letters Patent, is—

The combination, with the sides of the plow, of the strips $i$, pivoted thereto, a block rigidly secured between said strips at their rear ends, and a series of knives or cutters secured to said block, said knives being arranged to form an arc of a circle, and the lower end of the block recessed as shown, substantially as set forth.

In testimony that I claim the foregoing as my own I have hereto affixed my signature in presence of two witnesses.

GEORGE O. C. SRYGLEY.

Witnesses:
SAML. M. STEENSON,
WM. S. GRAY.